(12) United States Patent
Chiang

(10) Patent No.: US 11,673,791 B1
(45) Date of Patent: *Jun. 13, 2023

(54) FLUSH AND WINTERIZING SYSTEM

(71) Applicant: River Rock Inc., Santa Fe Springs, CA (US)

(72) Inventor: Michael Chiang, Rowland Heights, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,016

(22) Filed: Jul. 13, 2021

Related U.S. Application Data

(63) Continuation of application No. 16/704,375, filed on Dec. 5, 2019, now Pat. No. 11,066,291.

(51) Int. Cl.
| | | |
|---|---|---|
| *B67D 7/36* | (2010.01) | |
| *B67D 7/76* | (2010.01) | |
| *B60S 5/00* | (2006.01) | |

(52) U.S. Cl.
CPC ............. *B67D 7/36* (2013.01); *B60S 5/00* (2013.01); *B67D 7/76* (2013.01)

(58) Field of Classification Search
CPC ............. B67D 7/36; E03B 7/08; E03B 7/12
See application file for complete search history.

(56) References Cited

U.S. PATENT DOCUMENTS 11,066,291 B1 *  7/2021  Chiang .................... B60S 5/00

* cited by examiner

*Primary Examiner* — Reinaldo Sanchez-Medina
(74) *Attorney, Agent, or Firm* — The Law Office of Austin Bonderer, PC; Austin Bonderer

(57) ABSTRACT

A system and parts of a system that can be used to introduce fluid into a closed circuit. The system includes a valve having an inlet, an outlet, a flush inlet; a spool located in a valve body and coupled to a handle, and the spool can selectively, by the positioning of the handle, direct flow between the inlet, outlet, and flush inlet. The system also includes an uptake conduit comprising a valve connector that is configured to couple with the flush inlet, and a conduit, that is configured to allow fluid to flow therethrough. Additionally, the system has a system attachment having a system connector and a valve connector, and the uptake conduit and the system attachment are coupled to the valve.

15 Claims, 5 Drawing Sheets

FLUSH AND WINTERIZING SYSTEM

FIELD

The subject matter herein generally relates to winterization and flushing circuits for vehicles, including recreational vehicles and boats.

BACKGROUND

In areas where one would need to winterize a fluid circuit, there is a need to introduce a winterizing fluid into a circuit that contains water. However, given that the lines that carry drinking water or other fluids are filled with a fluid that prevents freezing or may become dirty, a flush may be desired in the circuit.

BRIEF DESCRIPTION OF THE DRAWINGS

Implementations of the present technology will now be described, by way of example only, with reference to the attached figures, wherein.

DETAILED DESCRIPTION

Figure 1:
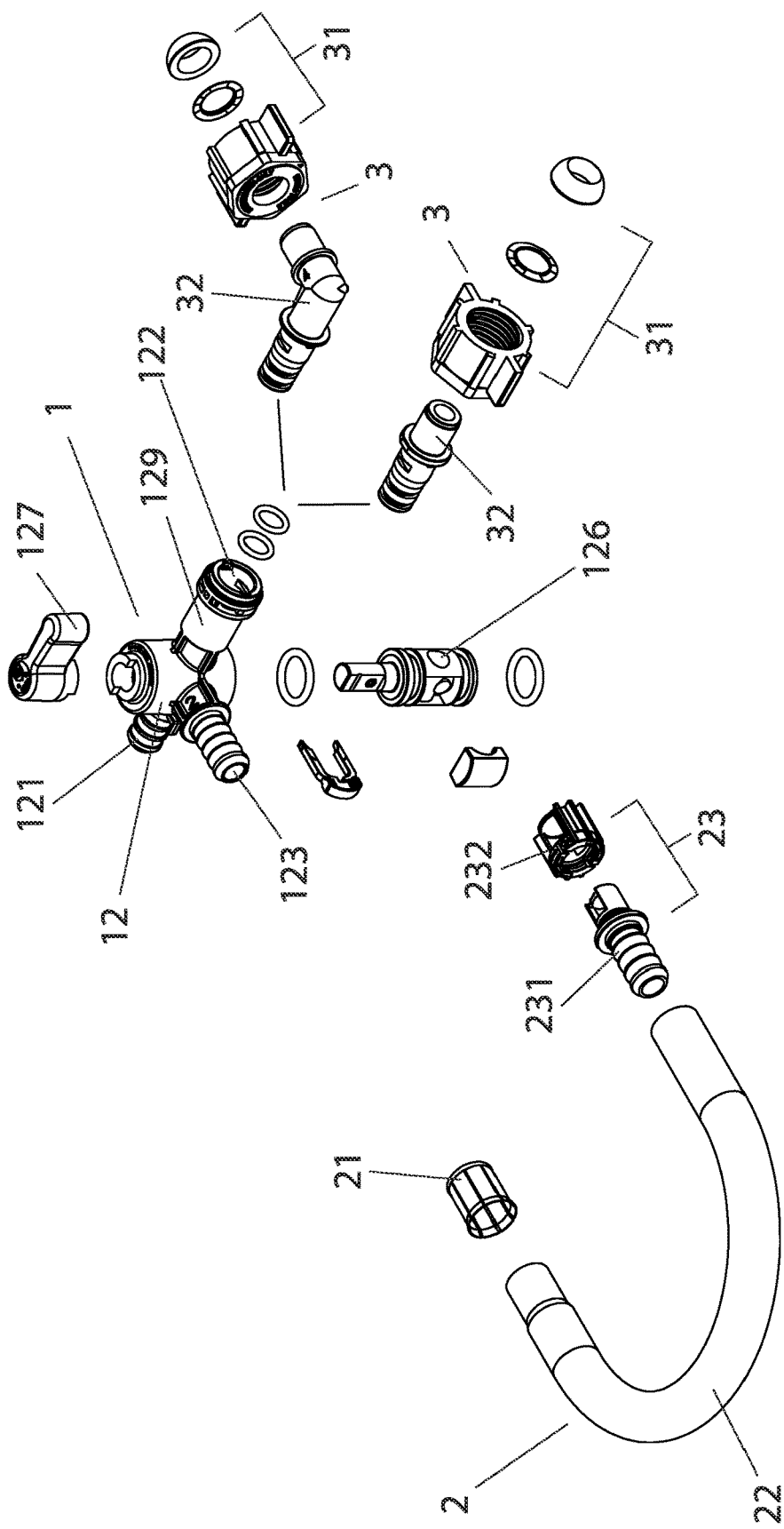
FIG. 1 is an embodiment of an uptake system in an exploded view.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to water flow circuits for vehicles, including boats, which include devices that are sensitive to winterizing fluids.

FIG. 1 illustrates an embodiment of the uptake system. The uptake system comprises a valve 1, an uptake conduit 2 and a circuit attachment 3. The uptake system is configured to selectively allow a fluid to be drawn into a circuit from an external container. In some embodiments, uptake conduit 2 is configured to attach to a container having fluid therein. In other embodiments, the uptake conduit 2 is configured to be placed inside a container (e.g. a bucket) having fluid therein (e.g. disinfectants, flush fluid, water, anti-freeze). It is also understood that in some embodiments, the uptake conduit can be outside a container such that it is exposed to air as a means to remove fluid from the circuit. It is to be understood that flush fluid is to refer to any fluid that is desired to be run into the circuit, and this includes, but is not limited to antimicrobial solutions and anti-freeze.

The valve 1 comprises a valve body 12 that has at least three passageways (e.g. a three-way valve) that is able to selectively direct fluid. In one configuration, the valve body 12 is in normal configuration position such that fluid will flow as usual through the circuit. In another configuration, the valve body 12 is in the flush configuration position such that a flush fluid will be drawn into the circuit. The valve body 12 comprises a handle 127, that is used to select the configuration of the valve body 12; a valve outlet 129, with the spool 126 located therein, defines an inlet 121, an outlet 122, and an uptake inlet 123. The spool 126 defines passages that allow for flow to occur from inlet 121 to outlet 122 in the normal configuration and allow for flow to occur from the uptake inlet 123 to the outlet 122 in the flush configuration. The handle 127 can select the configuration. In some embodiments, the valve body 12 has an off position such that no fluid can flow through the valve 1.

The uptake conduit 2 is coupled to the uptake inlet 123. In some embodiments, the uptake conduit 2 comprises an uptake conduit valve connector 21 and a conduit 22. In some embodiments, the uptake conduit 2 comprises an entry apparatus 23. In some embodiments, the entry apparatus 23 comprises a debris guard 232 to help prevent debris, bugs, and other items from entering the conduit 22. In some embodiments, the entry apparatus 23 comprises a conduit connection 231 and a debris guard 232. In some embodiments, the debris guard 232 comprises a selector that will allow the user to actuate between an open and closed position. In some embodiments, the debris guard 232 comprises a filter. In some embodiments, a protective end (not shown) will be located on an end of the conduit 22. In some embodiments, the uptake conduit 2 is coupled to the uptake inlet 123 employing a quick-connect system. In some embodiments the quick connect system is as described below.

Figure 2:
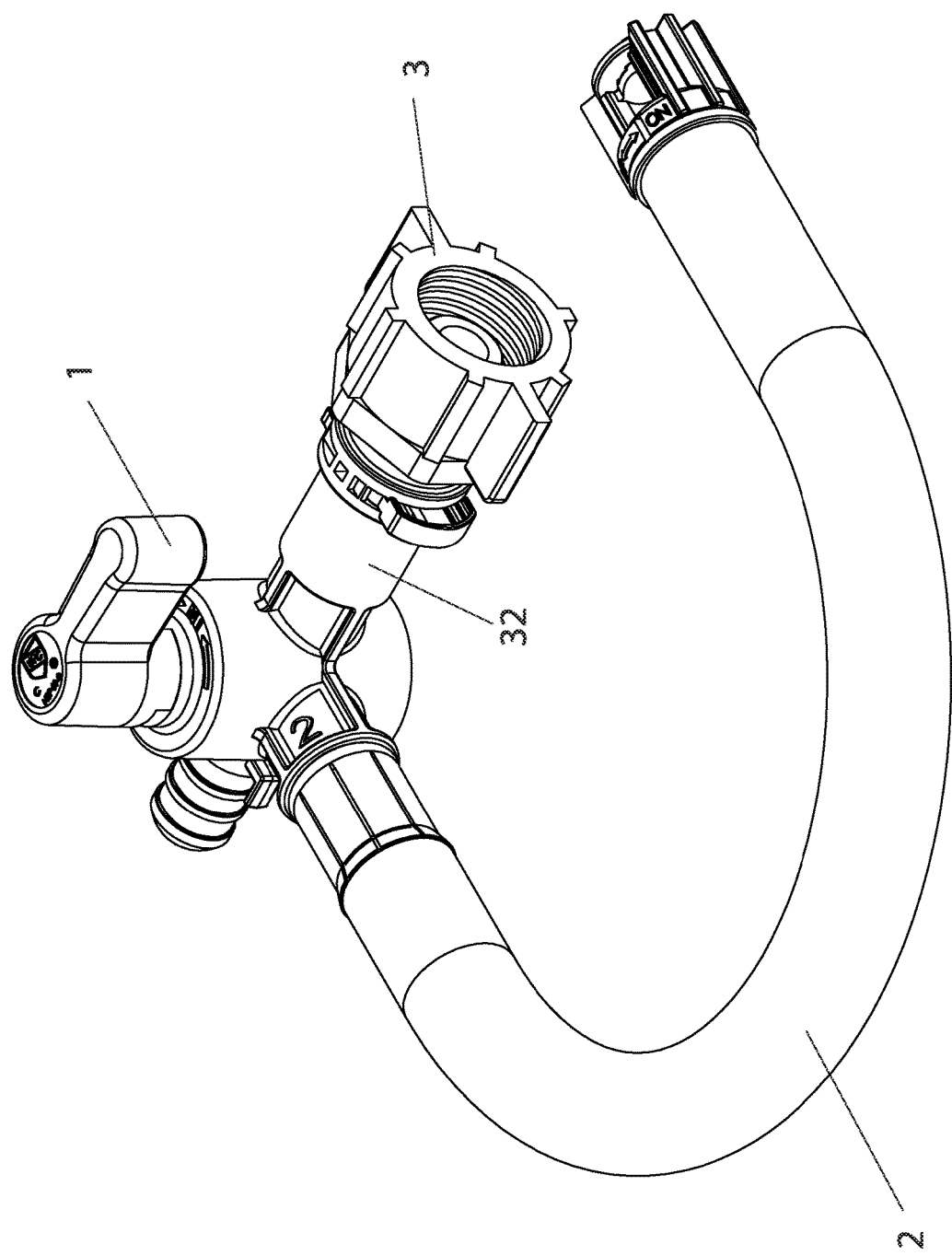
FIG. 2 is an embodiment of an uptake system.
Figure 3:
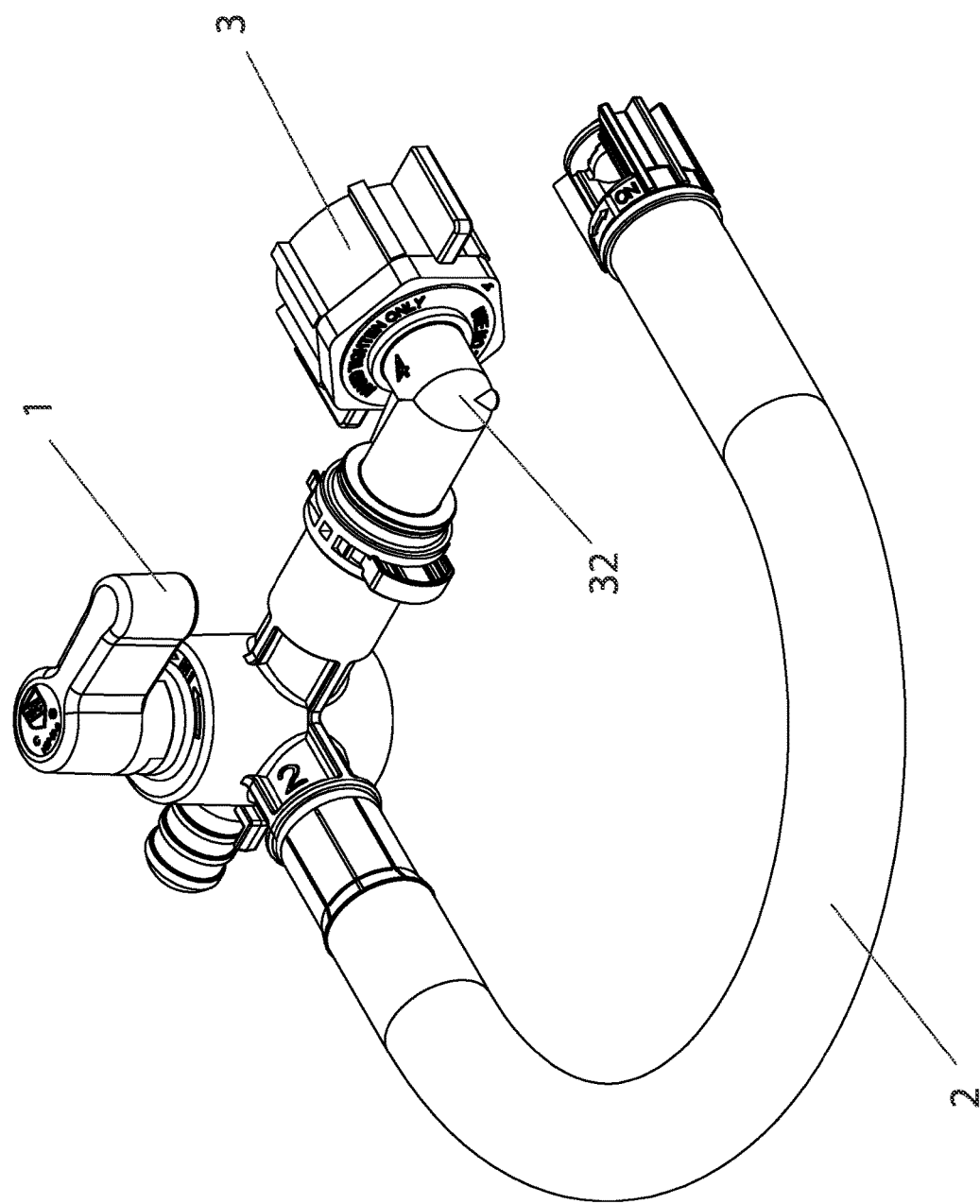
FIG. 3 is an embodiment of an uptake system.

The circuit attachment 3 is used to couple the valve 1 to the circuit. The connection comprises a valve connector 32 and a circuit connector 31. As seen in FIGS. 1-3, the valve connector 32 can have different embodiments. In some embodiment the valve connector 32 is straight, and in some other embodiments, the valve connector 32 has a bend. The valve connector 32 can be of any shape desired. In some embodiments, the circuit connector 31 comprises a compression connection type. In some embodiments the circuit connector 31 comprises a securing nut that is configured to allow a user to hand tighten the circuit connector 31 to a circuit. The valve connector 32 is coupled to the valve 1, and the circuit connector 31 is coupled to the circuit. In some embodiments the valve connector 32 and its coupling with the valve 1 group can be accomplished by a quick-connect system. In some embodiments, the quick-connect system comprises a clip that secures the circuit attachment 3 to the valve outlet 129.

Figure 4:
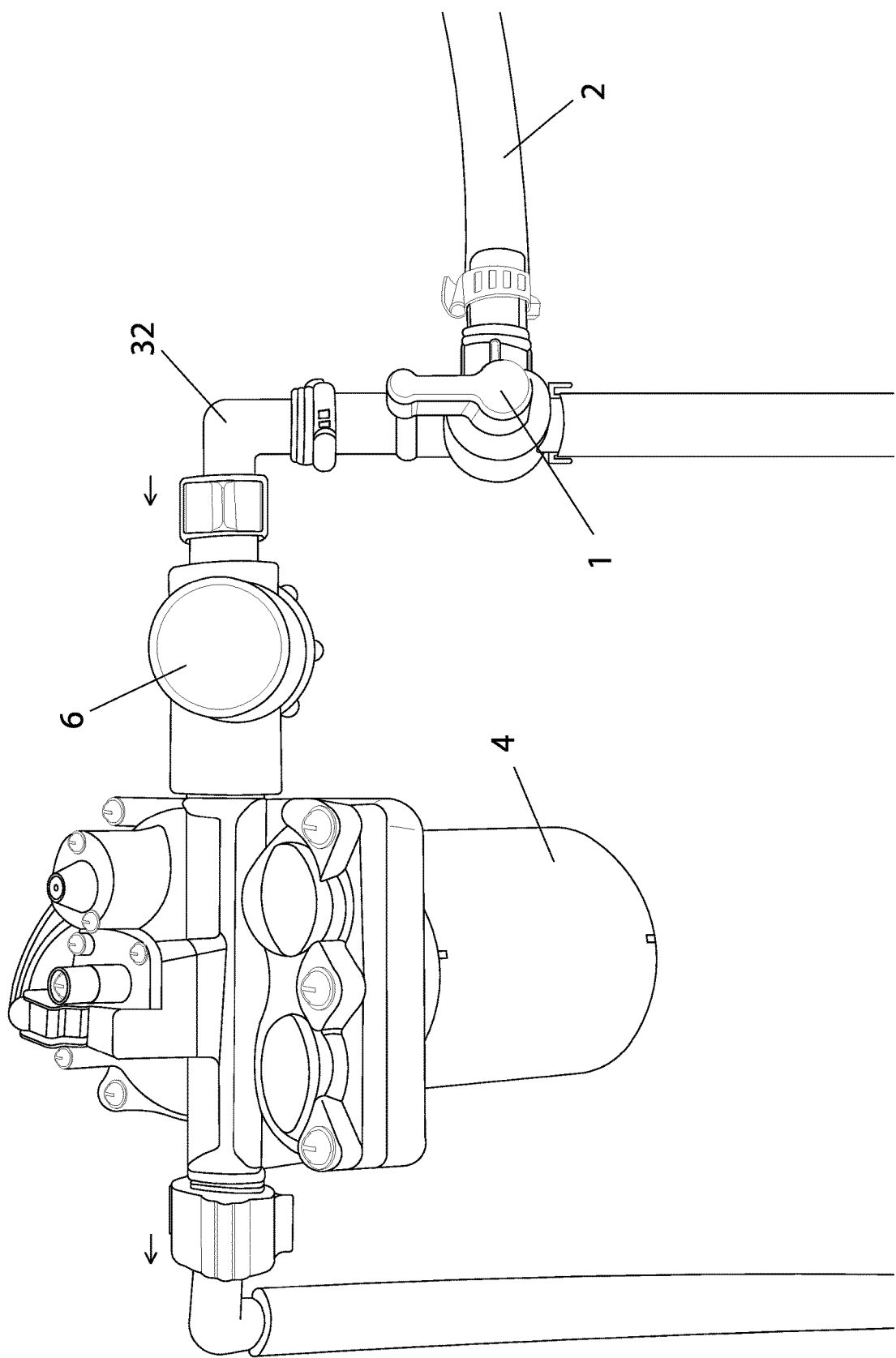
FIG. 4 shows an embodiment of an uptake system attached to a circuit.
Figure 5:
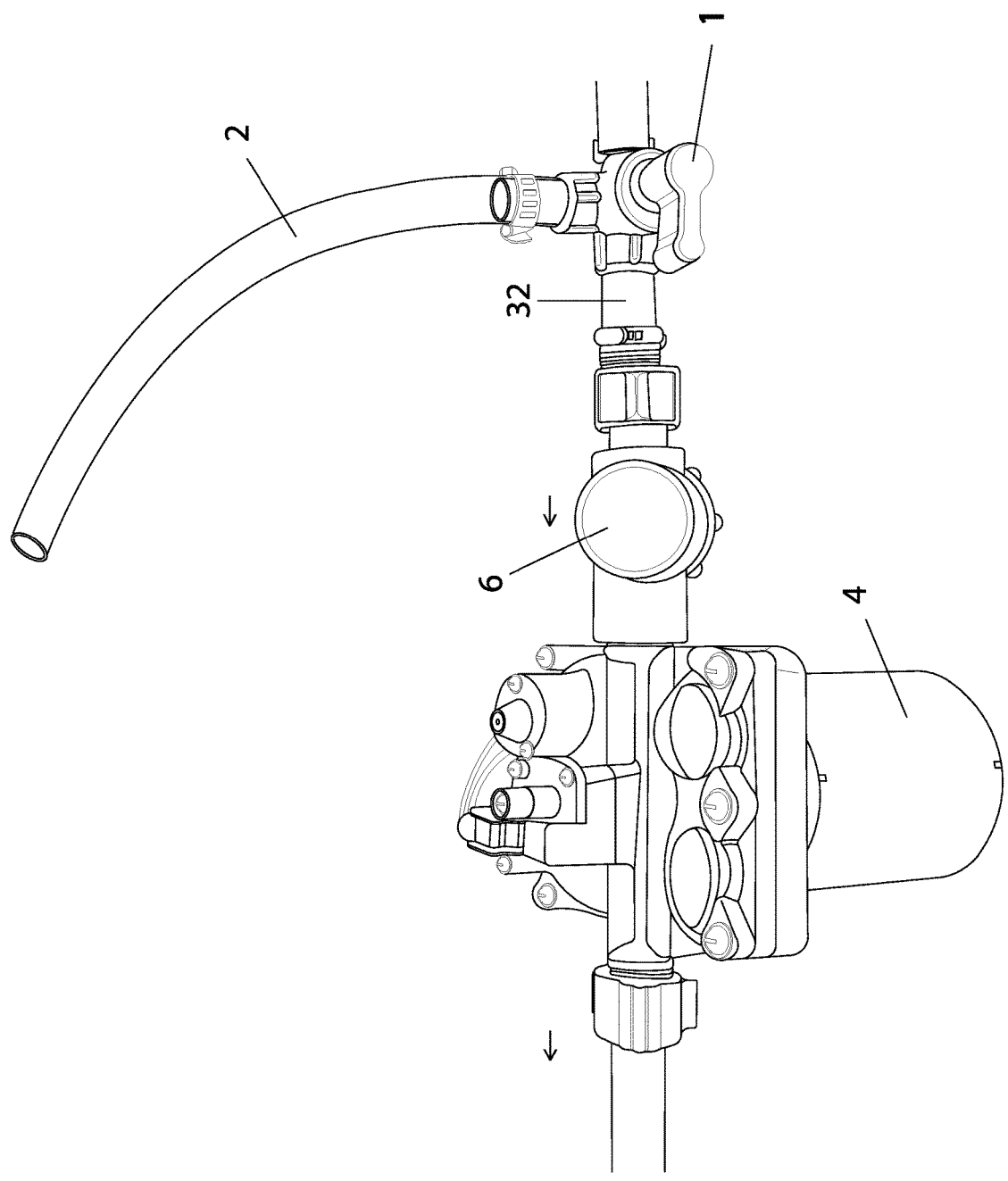
FIG. 5 shows an embodiment of an uptake system attached to a circuit.

FIGS. 4 and 5 show embodiments of the uptake system with a circuit. In some embodiments, the circuit comprises a pump 4. The pump 4 is coupled to the uptake system. As seen, the valve 1 is in the normal configuration so that fluid will flow through the circuit normally powered by the pump 4. When the handle 127 is turned to the flush configuration, pressure from the pump 4 (and/or a venturi-like effect) is able to pull fluid through the uptake conduit 2 and the valve 1 and out the circuit attachment 3 into the circuit.

In some embodiments, the circuit can comprise a circuit filter 6.

In some embodiments, during winterizing the circuit, the uptake conduit 2 can be coupled to or inserted in a body containing antifreeze. In some embodiments, the uptake conduit 2 comprises a conduit attachment to couple itself to a threaded opening. In some embodiments, the conduit attachment has substantially the same threading as industry accepted sizes for specific bottle types. In some embodiments, the uptake conduit 2 has an extension that is thinner than the conduit 22 to allow for insertion into a retail bottle container. The uptake conduit 2 can be placed in a container filled with anti-freeze. The antifreeze can be introduced into the circuit through the valve 1.

In some embodiments, during flushing the circuit, the uptake conduit 2 can be coupled to a body containing a flushing fluid. The flushing fluid can be, but not limited to, water, a solution, anti-microbial, a chlorine solution. The flushing fluid can be inserted into the circuit by the pressure created by the circuit. The uptake conduit 2 can be placed in a container filled with anti-freeze. In some embodiments, the uptake conduit 2 has an attachment to couple itself to a threaded opening. In some embodiments, after using a flushing fluid or anti-freeze, a rinse can be had with a solvent (e.g. water) to help remove any lingering flushing fluid and/or anti-freeze.

The uptake system can be coupled to a fresh-water circuit, a gray water circuit or a black water circuit. While the uptake system has been described with respect to vehicles, it is understood that the uptake system can be applied to any circuit where it is desired to introduce a fluid into a circuit.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
    a valve comprising an inlet, an outlet, and an uptake inlet;
        a spool located in a valve body and coupled to a handle, and the spool is configured to selectively, by the positioning of the handle, direct flow between the inlet, the outlet, and the uptake inlet;
    an uptake conduit comprising an uptake conduit valve connector, configured to couple with the uptake inlet, and a conduit, configured to allow fluid to flow therethrough; and
    a circuit attachment comprising a circuit connector and a valve connector;
    wherein the uptake conduit and the circuit attachment are coupled to the valve; the uptake conduit further comprises an entry apparatus comprising a conduit connection and a debris guard; the debris guard is configured to actuate between an open position and a closed position; and when the debris guard is in the closed position, the debris guard prevents debris larger than a certain size from entering into the conduit.

2. The apparatus of claim 1, wherein the debris guard comprises a selector configured to selectively actuate the debris guard from the open position to the closed position.

3. The apparatus of claim 1, wherein the debris guard comprises a filter configured to filter fluid entering the conduit.

4. The apparatus of claim 1, wherein the conduit and the debris guard have a diameter that is less than 1.5 inches (3.81 centimeters).

5. The apparatus of claim 1, wherein the conduit and the debris guard have a diameter that is less than 2 inches (5.08 centimeters).

6. The apparatus of claim 1, wherein the debris guard is threaded.

7. The apparatus of claim 1, wherein the uptake conduit is coupled to the valve by a quick connect.

8. The apparatus of claim 1, wherein the circuit attachment is coupled to the valve by a quick connect.

9. The apparatus of claim 1, further comprising a circuit and a pump; wherein the pump and the valve are within the circuit, and the valve is located before the pump on the circuit such that the pump draws from the valve.

10. The apparatus of claim 9, wherein the circuit further comprises a circuit filter.

11. The apparatus of claim 9, further comprising a vehicle and the circuit is a potable water circuit.

12. The apparatus of claim 9, further comprising a vehicle and the circuit is a gray water circuit.

13. The apparatus of claim 9, further comprising a vehicle and the circuit is a black water circuit.

14. The apparatus of claim 1, wherein the valve is a three-way valve.

15. The apparatus of claim 1, wherein the valve is able to prevent all fluid from passing therethrough.

\* \* \* \* \*